(12) United States Patent
Hasegawa et al.

(10) Patent No.: US 7,340,137 B2
(45) Date of Patent: Mar. 4, 2008

(54) OPTICAL FIBER AND OPTICAL MODULE (75) Inventors: Takemi Hasegawa, Kanagawa (JP); Masaaki Hirano, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/586,004

(22) Filed: Oct. 25, 2006

(65) Prior Publication Data

US 2007/0147755 A1 Jun. 28, 2007

(30) Foreign Application Priority Data

Oct. 25, 2005 (JP) ............................. 2005-310052

(51) Int. Cl.
*G02B 6/02* (2006.01)
(52) U.S. Cl. ..................................... 385/123
(58) Field of Classification Search ................. 385/123
See application file for complete search history.

(56) References Cited

U.S. PATENT DOCUMENTS

| 5,170,457 A | | 12/1992 | Jen | |
|---|---|---|---|---|
| 7,130,514 B1 | * | 10/2006 | Chen et al. | ................. 385/123 |
| 7,228,039 B2 | * | 6/2007 | Bickham et al. | ............ 385/123 |

OTHER PUBLICATIONS

Okuno, et al., "Silica-Based Functional Fibers with Enhanced Nonlinearity and Their Applications," IEEE Journal of Selected Topics in Quantum Electronics, Sep./Oct. 1999, pp. 1385-1391, vol. 5, No. 5, IEEE.

Hansryd, et al., "Increase of the SBS Threshold in a Short Highly Nonlinear Fiber by Applying a Temperature Distribution," Journal of Lightwave Technology, Nov. 2001, pp. 1691-1697, vol. 19, No. 11, IEEE.

Koyamada, et al., "Simulating and Designing Brillouin Gain Spectrum in Single-Mode Fibers," Journal of Lightwave Technology, Feb. 2004, pp. 631-639, vol. 22, No. 2, IEEE.

Hasegawa, et al., "Analysis of SBS in optical fiber based on FEM-based acoustic and optical mode solvers," General Conference of the Institute of Electronics, Information and Communication Engineers, 2005.

Oliveira, et al., "Simulated Brillouin scattering in cascaded fibers of different Brillouin frequency shifts," J. Opt. Soc. Am. B, Jun. 1993, pp. 969-972, vol. 10, No. 6, Optical Society of America.

* cited by examiner

*Primary Examiner*—Sarah Song
(74) *Attorney, Agent, or Firm*—McDermott Will & Emery LLP (57) ABSTRACT

An optical fiber capable of effectively suppressing stimulated Brillouin scattering, and an optical module including the fiber are provided. The fiber includes a core region, and a cladding region having a refractive index lower than that of the core region and an acoustic velocity higher than that of the core region. An effective area of the fiber is $5\lambda^2$ or less at at least one light wavelength $\lambda$. The ratio $\Delta_A/\Delta_O$ of an acoustic relative refractive index ratio $\Delta A$ and an optical relative refractive index ratio $\Delta_O$ is 25 or more. The optical module includes the optical fiber, a light source that outputs first light having a wavelength $\lambda_1$, and a multiplexer that receives the first light and second light having a wavelength $\lambda_2$ and that multiplexes and couples the first light and the second light to the optical fiber.

10 Claims, 10 Drawing Sheets

OPTICAL FIBER AND OPTICAL MODULE

BACKGROUND OF THE INVENTION

1. Field of the Invention

The present invention relates to an optical fiber suitably used for transmission of optical signals or optical power or for optical amplification, and to an optical module including the optical fiber.

2. Description of the Related Art

A highly nonlinear optical fiber has a nonlinear optical coefficient higher than that of an optical fiber that is used as an optical transmission line in optical transmission. The highly nonlinear optical fiber is adopted in, for example, an optical switch, an optical amplifier, and a light generator (see T. Okuno et al., IEEE J. Sel. Top. Quant. Electron. Vol. 5 (1999) 1385). It is known that performance of the highly nonlinear optical fiber is limited by the occurrence of stimulated Brillouin scattering (SBS).

In J. Lightwave Techn. Vol. 19 (2001) 1691, J. Hansryd et al. disclose a method for suppressing SBS by forming a temperature gradient in the longitudinal direction of a highly nonlinear optical fiber so that a Brillouin gain spectrum is nonuniform in the longitudinal direction. In this method, high energy consumption for holding the temperature gradient is a problem. Further, U.S. Pat. No. 5,170,457 proposes to suppress SBS by reducing the number of guided acoustic modes in an optical fiber to zero (by adopting an antiguide structure). In this optical fiber, it is impossible to achieve both light propagation in a narrow area and effective suppression of SBS.

SUMMARY OF THE INVENTION

Accordingly, it is an object of the present invention to provide an optical fiber that can effectively suppress SBS, and an optical module including the optical fiber.

In order to achieve the above object, an optical fiber according to the present invention includes a core region including a center axis, and a cladding region surrounding the core region and having a refractive index lower than a refractive index of the core region and an acoustic velocity higher than an acoustic velocity of the core region. An effective area of the optical fiber is $5\lambda^2$ or less at at least one light wavelength $\lambda$. In one aspect, the ratio $\Delta_A/\Delta_O$ of an acoustic relative refractive index difference $\Delta_A$ and an optical relative refractive index difference $\Delta_O$ of the optical fiber is 25 or more. The acoustic relative refractive index difference $\Delta_A$ and the optical relative refractive index difference $\Delta_O$ are given by the following expressions:

$$\Delta_A = 100 \times \left( \frac{\text{acoustic refractive index of core region}}{\text{acoustic refractive index of cladding region}} - 1 \right)\%$$

$$\Delta_O = 100 \times \left( \frac{\text{refractive index of core region}}{\text{refractive index of cladding region}} - 1 \right)\%$$

In another aspect, a cable cutoff wavelength of the optical fiber is shorter than the light wavelength $\lambda$, and the number of guided acoustic modes phase-matched with a fundamental optical mode at the wavelength $\lambda$ is 10 or more.

Preferably, the light wavelength $\lambda$ is within the range of 1530 nm to 1620 nm that permits high availability of an existing technology for light production and detection. In the core region and the cladding region, the physical quantity, such as the refractive index or the acoustic velocity, does not necessarily need to be spatially uniform. When the physical quantity is not spatially uniform, an average physical quantity weighted by volume in the region serves as the physical quantity of the region.

An optical module according to the present invention includes the optical fiber according to the present invention, a light source that outputs first light having a wavelength $\lambda_1$, and a multiplexer that receives the first light and second light having a wavelength $\lambda_2$ and that multiplexes and couples the first light and the second light to the optical fiber.

DESCRIPTION OF THE PREFERRED EMBODIMENTS

As a result of earnest studies, the inventors of the present invention found that stimulated Brillouin scattering (SBS) could be suppressed by increasing the number of guided acoustic modes in a manner converse to the above-described proposal in U.S. Pat. No. 5,170,457. The best mode for carrying out the present invention will be described in detail below with reference to the attached drawings. In the description of the drawings, like components are denoted by like reference numerals, and redundant descriptions thereof are omitted.

Figure 1:
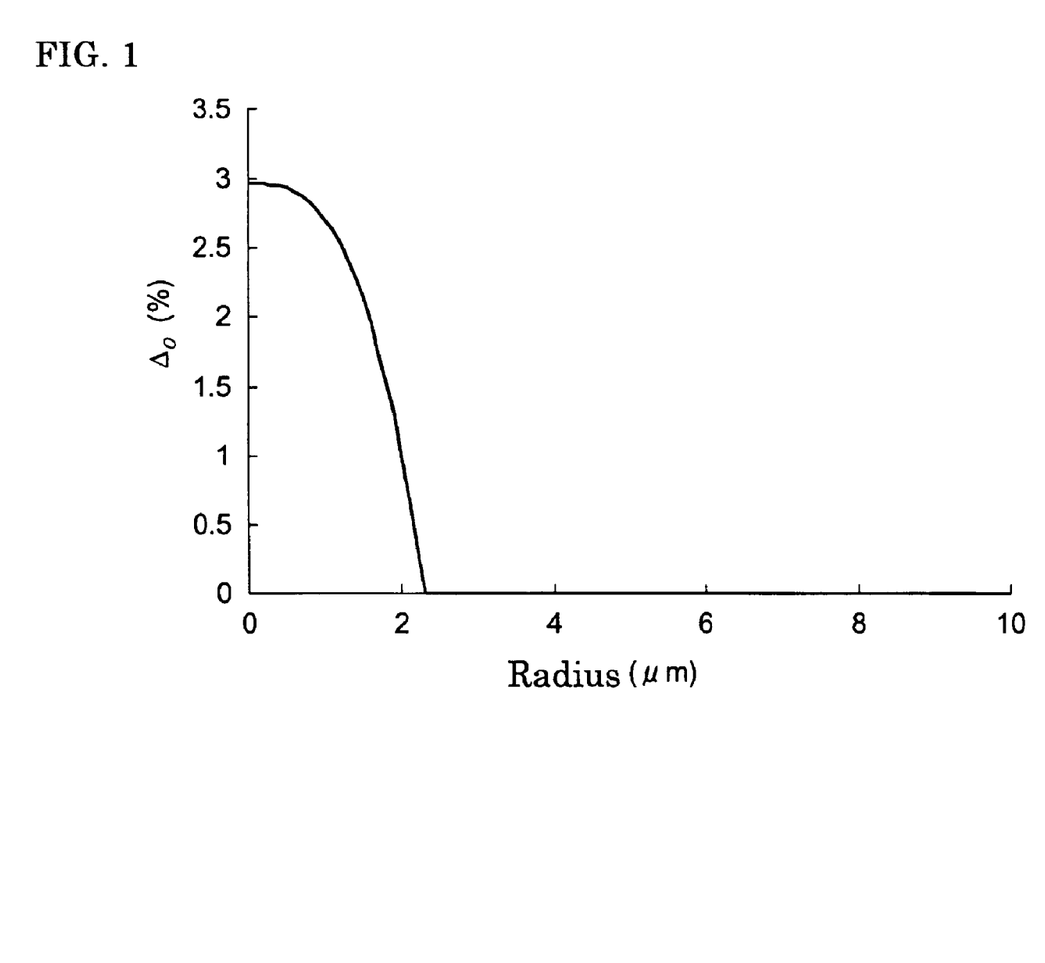
FIG. 1 is a graph showing a refractive index profile of optical fibers according to an embodiment of the present invention and a comparative example.

FIG. 1 is a graph showing a refractive index profile of optical fibers according to an embodiment of the present invention and a comparative example. Each of the optical fibers according to the embodiment and the comparative example includes a core region including a center axis, and a cladding region surrounding the core region. The refractive index of the cladding region is lower than that of the core region, and the acoustic velocity in the cladding region is higher than in the core region. An effective area is $5\lambda^2$ or less at at least one light wavelength $\lambda$. In each of the optical fibers according to the embodiment and the comparative example, the refractive index profile of the core region is an $\alpha$-square profile in which the coefficient $\alpha$ is 3, and the core radius is 2.29 μm. The peak value of an optical relative refractive index difference $\Delta_O$ between the core region and the cladding region is 3%, and the average value of the difference is 1.8% in the core region.

Figure 2:
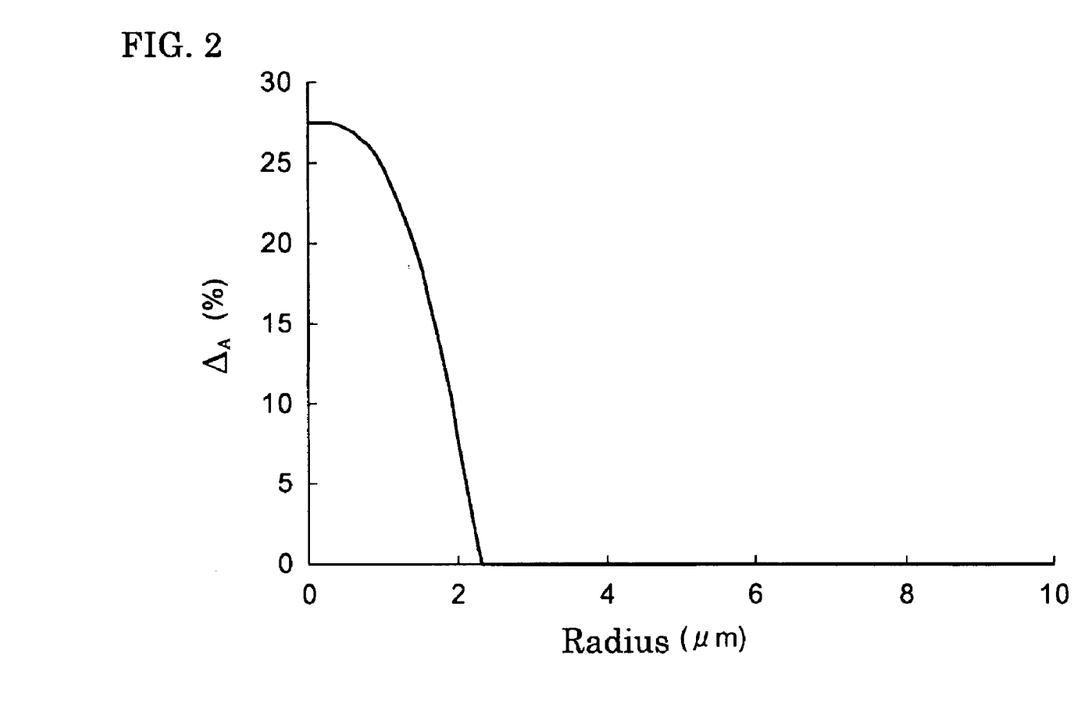
FIG. 2 is a graph showing an acoustic refractive index profile of the optical fiber according to the comparative example.

The optical fiber according to the comparative example can be constituted of the core region formed of $GeO_2$—$SiO_2$ and the cladding region formed of $SiO_2$. FIG. 2 is a graph showing an acoustic refractive index profile of the optical fiber according to the comparative example. In this optical fiber, the peak value of an acoustic relative refractive index difference $\Delta_A$ is 27.6%, the average value of the difference is 15.3% in the core region, and the ratio $\Delta_A/\Delta_O$ is 8.7. The relationship between the composition and the acoustic relative refractive index difference is taught by Expressions (6) to (9) in Y. Koyamada et al., J. Lightwave Techn., Vol. 22 (2004) 631-639 and Table 1 in C.A.S. de Oliveira et al., J. Opt. Soc. Am. B, Vol. 10 (1993) 969. The acoustic refractive index is given by the following equation:

$$\text{Acoustic refractive index} = \frac{\text{Acoustic velocity in } SiO_2}{\text{Acoustic velocity in target medium}}$$

Herein, the acoustic velocity is a longitudinal acoustic velocity, unless otherwise specified.

Figure 3:
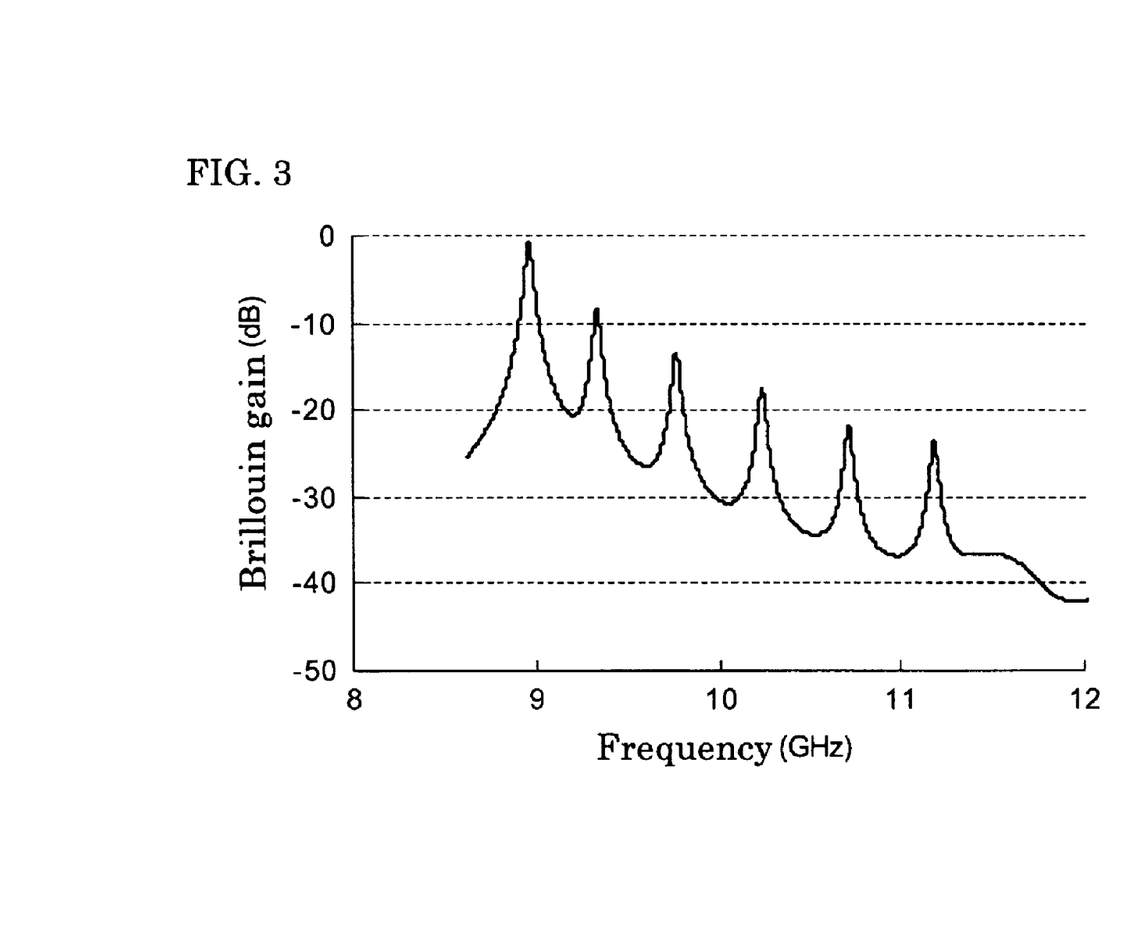
FIG. 3 is a graph showing a Brillouin gain spectrum of the optical fiber according to the comparative example.

FIG. 3 is a graph showing a Brillouin gain spectrum of the optical fiber according to the comparative example. In FIG. 3, the Brillouin gain on the ordinate is normalized so that a value obtained by reversing the sign of the Brillouin gain peak represents an SBS threshold value at the wavelength of 1.55 µm provided when the effective fiber length is 22 km. Normalization is performed on the results of comparison between observed values and calculated values of several types of optical fibers. Such comparison results are disclosed in Hasegawa et al., Proceedings of General Conference of the Institute of Electronics, Information, and Communication Engineers, 2005, C-3-26. The Brillouin gain described in this specification is similarly normalized, unless otherwise specified.

A guided acoustic mode is defined as follows. First, a fundamental mode (propagation constant $\beta_{opt}$) of light having a wavelength $\lambda$ of 1.55 µm is found from the refractive index profile. Next, an acoustic mode having a propagation constant $\beta_{aco}=2\beta_{opt}$ is found by solving an acoustic wave equation in the cross section of the fiber. As a result, it is determined that the acoustic mode is a guided acoustic mode when the frequency $f_{aco}$ of the acoustic mode satisfies the following condition:

$$f_{aco} < f_{clad} = \frac{V_{clad}\beta_{aco}}{2\pi}$$

where $V_{clad}$ represents the acoustic velocity of the cladding region. In the comparative example in which the cladding region is formed of $SiO_2$, $V_{clad}$ is 5.944 km/s. Further, since $\beta_{opt}$ is 5.95 µm, $f_{clad}$ is 11.3 GHz.

As shown in FIG. 3, the Brillouin gain of the comparative example has six peaks, and the highest one of the peaks is −0.74 dB (SBS threshold value is 0.74 dB). Among these six peaks, five peaks for frequencies lower than $f_{clad}$ correspond to guided modes, and one peak for a frequency higher than or equal to $f_{clad}$ corresponds to a radiation mode (cladding mode) localized in the cladding region.

Figure 4:
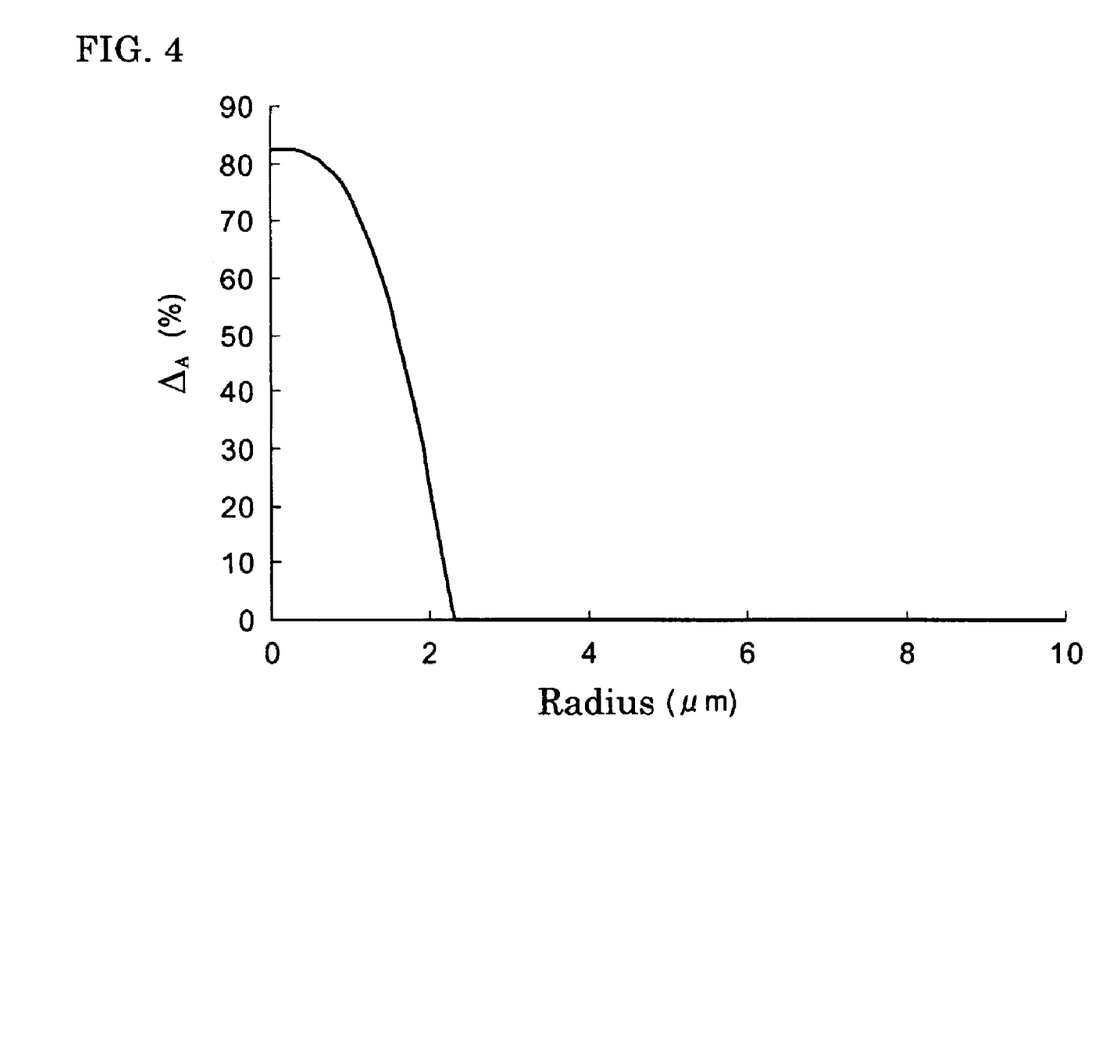
FIG. 4 is an acoustic refractive index profile of the optical fiber according to the embodiment.
Figure 5:
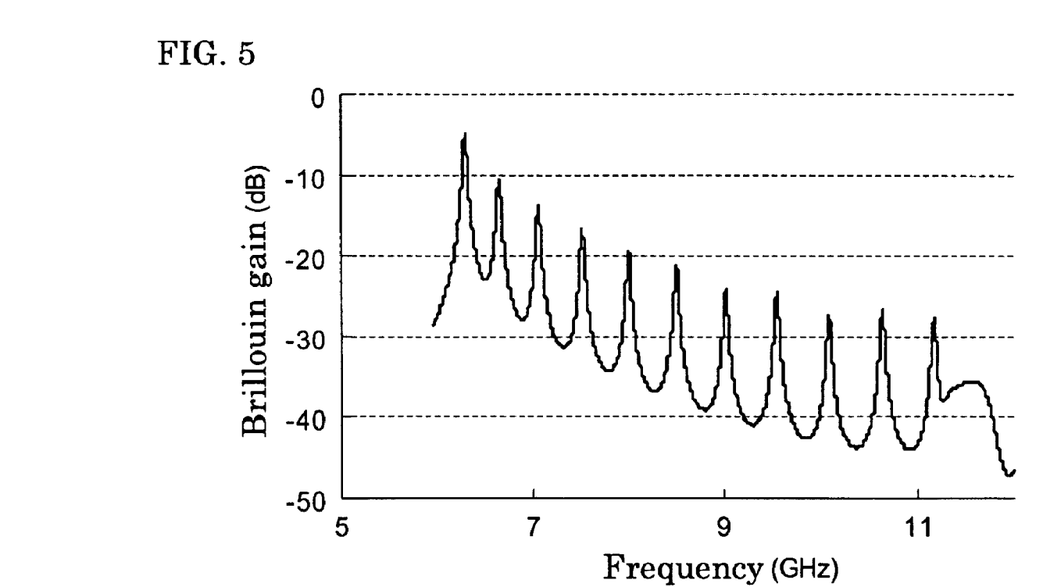
FIG. 5 is a graph showing a Brillouin gain spectrum of the optical fiber according to the embodiment.

In contrast, in the optical fiber according to the embodiment, the core region is formed of $SiO_2$—$GeO_2$—F ($SiO_2$ to which $GeO_2$ and F are added), and the cladding region is formed of $SiO_2$. FIG. 4 is a graph showing an acoustic refractive index profile of the optical fiber, and FIG. 5 is a Brillouin gain spectrum of the optical fiber. In FIG. 5, the Brillouin gain on the ordinate is also normalized so that a value obtained by reversing the sign of the Brillouin gain peak represents an SBS threshold value at the wavelength of 1.55 µm provided when the effective fiber length is 22 km.

In the embodiment, as shown in FIG. 4, the peak value of an acoustic relative refractive index difference $\Delta_A$ is 82.7%, the average value thereof is 46.0%, and the ratio $\Delta_A/\Delta_O$ is 26.1. These values are higher than those in the comparative example. Consequently, the number of peaks of the gain spectrum increases from six in FIG. 3 to eleven in FIG. 5, and the peak gain decreases from −0.74 dB in FIG. 3 to −0.440 dB in FIG. 5 (the SBS threshold value is 4.4 dB). Ten of the peaks correspond to guided modes. By thus increasing the number of guided acoustic modes that have amplitudes in at least a part of the optical core region (that is, interact with a fundamental mode of light) and that are different in frequency, the number of peaks in the Brillouin gain spectrum increases, and the height of each peak decreases. As a result, the SBS threshold value governed by the peak height of the gain spectrum is improved (increased).

Figure 6:
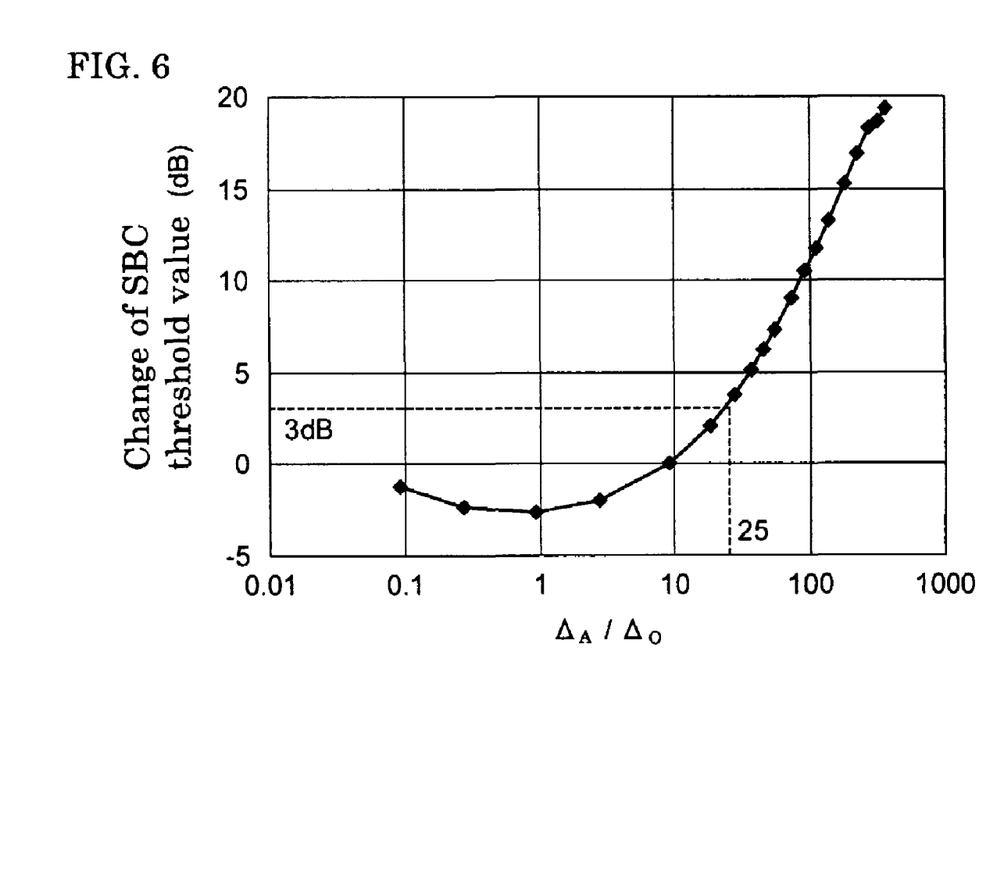
FIG. 6 is a graph showing the relationship between the ratio $\Delta_A/\Delta_O$ and the change of an SBS threshold value.

FIG. 6 is a graph showing the relationship between the ratio $\Delta_A/\Delta_O$ and the change of the SBS threshold value. Herein, the optical relative refractive index difference $\Delta_O$ of the optical fiber is fixed to 3%, and the acoustic relative refractive index difference $\Delta_A$ varies. The change of the SBS threshold value is expressed by the amount of change from a reference value that corresponds to the SBS threshold value in the comparative example in which the ratio $\Delta_A/\Delta_O$ is 8.7. When the ratio $\Delta_A/\Delta_O$ increases and exceeds 25, the change of the SBS threshold value exceeds 3 dB. That is, the SBS threshold value significantly increases (SBS is suppressed).

Therefore, the SBS threshold value can be increased by adjusting the profile of the optical relative refractive index difference $\Delta_O$ and also maximizing the acoustic relative refractive index difference $\Delta_A$. SBS sometimes limits the upper limit of optical power that can be launched into, for example, a communication transmission line, a dispersion compensation fiber (particularly, in a case it is also a Raman amplification fiber), a fiber amplifier (particularly using Raman amplification and optical parametric amplification), and a high-power optical transmission line. Accordingly, it is preferable to increase the SBS threshold value by increasing the acoustic relative refractive index difference $\Delta_A$, as in this embodiment.

In the present invention, SBS can be suppressed by increasing the ratio $\Delta_A/\Delta_O$ so as to increase the number of guided acoustic modes, to reduce overlapping between the respective acoustic modes and the fundamental optical mode (LP01), and to reduce the optical gain induced by the acoustic modes. Further, since the number of guided acoustic modes can be increased without increasing the number of optical guided modes, instability in the optical properties caused by mode coupling between the fundamental mode and higher-order modes of light can be prevented.

In order to increase the ratio $\Delta_A/\Delta_O$, it is effective to properly select the compositions of the core region and the cladding region in the optical fiber. The following table shows the optical relative refractive index difference $\Delta_O$, $\Delta_{VSSCS}$, and the ratio $\Delta_{VSSCW}/\Delta_O$ when a unit quantity of dopant is added to $SiO_2$:

TABLE

|  | $\Delta_O$ %/wt % | $\Delta_{VSSCW}$ %/wt % | $-\Delta_{VSSCW}/\Delta_O$ |
|---|---|---|---|
| $GeO_2$ | 0.05625 | 0.47 | 8.4 |
| $P_2O_5$ | 0.01974 | 0.31 | 15.7 |
| F | 0.313 | 3.6 | 11.5 |
| $TiO_2$ | 0.2347 | 0.59 | 2.5 |
| $Al_2O_3$ | 0.06285 | 6.7 | 0.42 |

The above table is created on the basis of the table shown in the eight column of the specification of U.S. Pat. No. 5,170,457. In Table, $\Delta_{VSSCW}$ represents to the longitudinal acoustic velocity. According to the definition of the acoustic relative refractive index difference $\Delta_A$, when the acoustic relative refractive index difference $\Delta_A$ is small, $\Delta_{VSSCW}$ can be approximated by $-\Delta_A$. Therefore, the ratio $-\Delta_{VSSCW}/\Delta_O$ corresponds to the ratio $\Delta_A/\Delta_O$.

Table shows that the following methods are preferably used to increase the ratio $\Delta_A/\Delta_O$. That is, in order to increase the refractive index of the core region, it is preferable to add $GeO_2$, and more preferably, to add $P_2O_5$ to the core region. In particular, it is preferable to add at least one of Ge and P, which increase the refractive index, and F, which decreases the refractive index, to the core region. Moreover, $Al_2O_3$ is added to the cladding region so as to decrease the acoustic relative refractive index difference $\Delta_A$. Although the difference in optical relative refractive index difference $\Delta_O$ between the core region and the cladding region is thereby decreased, the decrease is compensated for by adding $GeO_2$ (more preferably, $P_2O_5$) to the core region. The above-described methods are also applicable not only to an optical fiber in which each of the core region and the cladding region is formed of one layer, but also to a known multilayer structure having a W-shaped profile or a triple-clad profile. These methods allow SBS to be suppressed by using the existing optical-fiber manufacturing technology.

Figure 7:
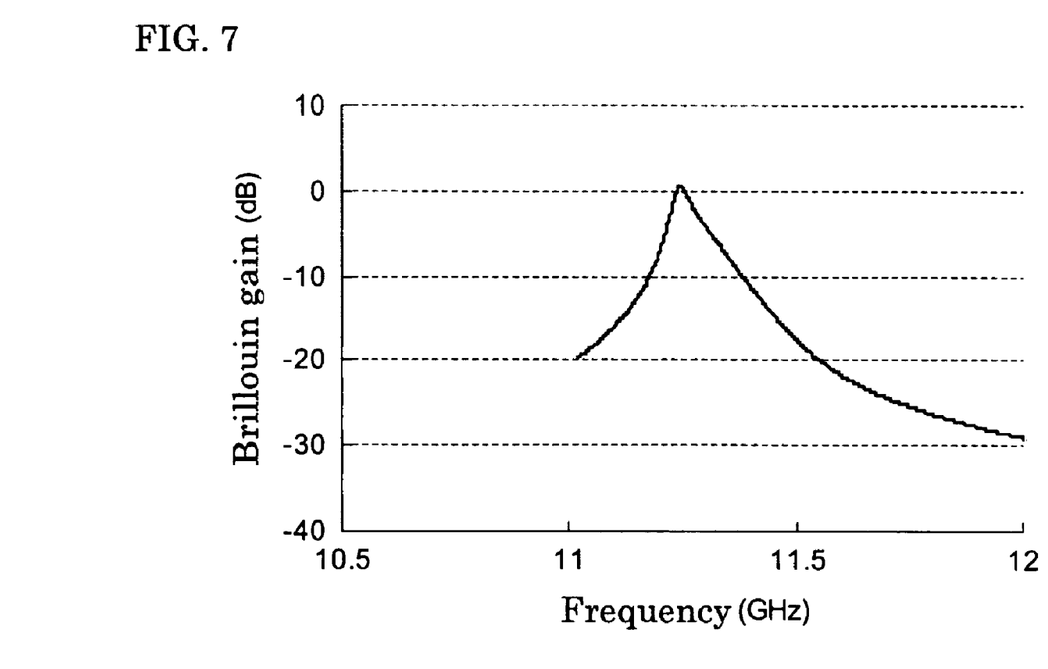
FIG. 7 is a graph showing a Brillouin gain spectrum of an optical fiber in which the ratio $\Delta_A/\Delta_O$ is 0.1.
Figure 8:
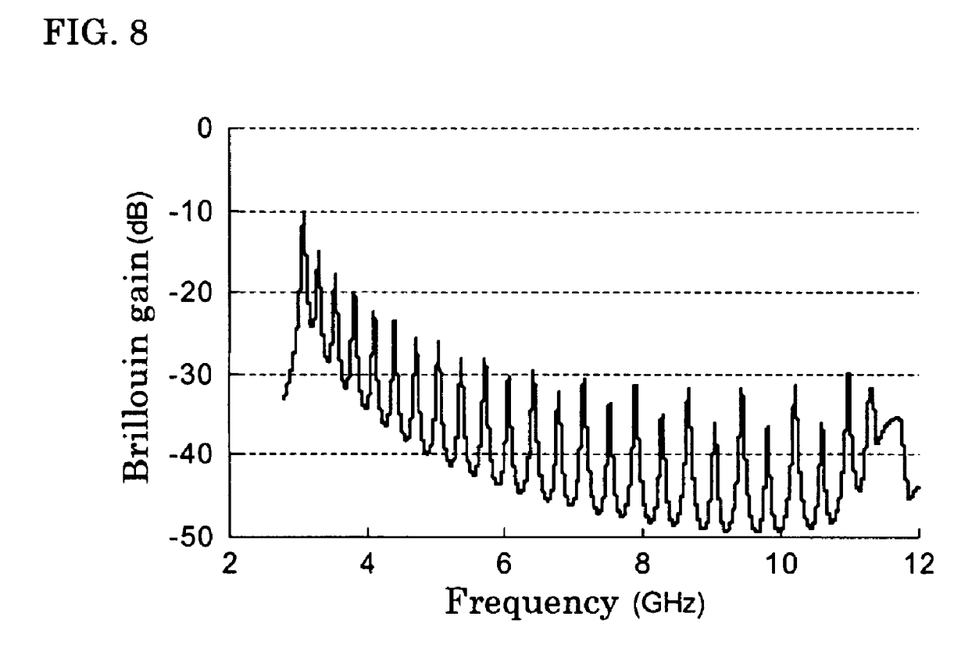
FIG. 8 is a graph showing a Brillouin gain spectrum of an optical fiber in which the ratio $\Delta_A/\Delta_O$ is 87.0.

FIGS. 7 and 8 are graphs showing Brillouin gain spectra of the optical fiber. FIG. 7 shows a case in which the ratio $\Delta_A/\Delta_O$ is 0.1, and FIG. 8 shows a case in which the ratio $\Delta_A/\Delta_O$ is 87.0. When the ratio $\Delta_A/\Delta_O$ is a small value of 0.1 (FIG. 7), the optical fiber can be regarded as a medium that has a substantially uniform acoustic characteristic. In this case, the Brillouin gain spectrum has only one gain peak, and the peak gain is a large value of +0.52 dB. When the ratio $\Delta_A/\Delta_O$ is 8.7 (FIG. 3), the number of gain peaks increases to six, and the peak gain is slightly decreased to −0.74 dB. When the ratio $\Delta_A/\Delta_O$ is 26.1 (FIG. 5), the number of gain peaks increases to ten, and the peak gain decreases to −4.40 dB. That is, the peak gain decreases significantly such as 3 dB or more. When the ratio $\Delta_A/\Delta_O$ is 87.0 (FIG. 8), the number of gain peaks increases to twenty five, the spectrum further spreads, and the peak gain decreases to −11.2 dB.

Figure 9:
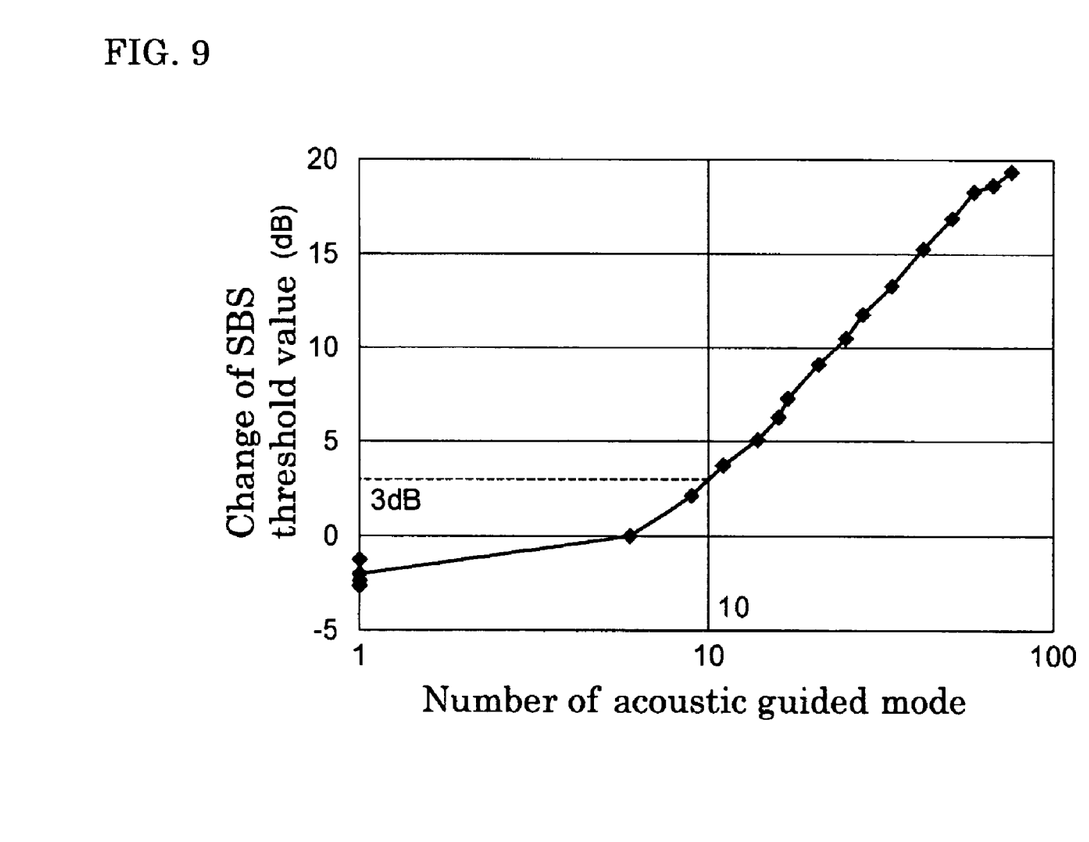
FIG. 9 is a graph showing the relationship between the number of guided acoustic modes of the optical fiber and the change of the SBS threshold value.

FIG. 9 is a graph showing the relationship between the number of guided acoustic modes in the optical fiber and the change of the SBS threshold value. In FIG. 9, the ordinate represents the SBS threshold value, similarly to FIG. 6, and the abscissa represents the number of guided acoustic modes that phase-matched with the fundamental optical mode at a wavelength of 1.55 μm.

As shown in FIG. 9, when the number of guided acoustic modes exceeds 10, the SBS threshold value increases and exceeds 3 dB, and this increase has a significantly effect. In this case, the distribution of the optical refractive index is the same as in FIG. 1, and the cable cutoff wavelength can be maintained at 1.54 μm that is shorter than the light wavelength λ. In this way, the SBS threshold value can be increased by increasing the number of guided acoustic modes, and consequently, more optical power can be launched into the optical fiber without causing SBS. Further, since the ratio $\Delta_A/\Delta_O$ is increased, the number of guided acoustic modes can be increased without increasing the number of optical guided modes (without increasing the cutoff wavelength).

In the present invention, the number of guided acoustic modes is increased, and a waveguide structure is adjusted so that the optical guided mode overlaps with a plurality of guided acoustic modes having different frequencies. This reduces overlapping between each acoustic mode and the fundamental mode (LP01) of light, the Brillouin gain is dispersed regarding the frequency axis, and the optical gain induced by each of the acoustic modes is reduced. Consequently, it is possible to reduce the SBS threshold value governed by the maximum Brillouin gain. Further, since the single mode of light can be substantially maintained, instability of the optical properties caused by mode coupling between the fundamental optical mode and higher-order modes can be prevented.

Figure 10:
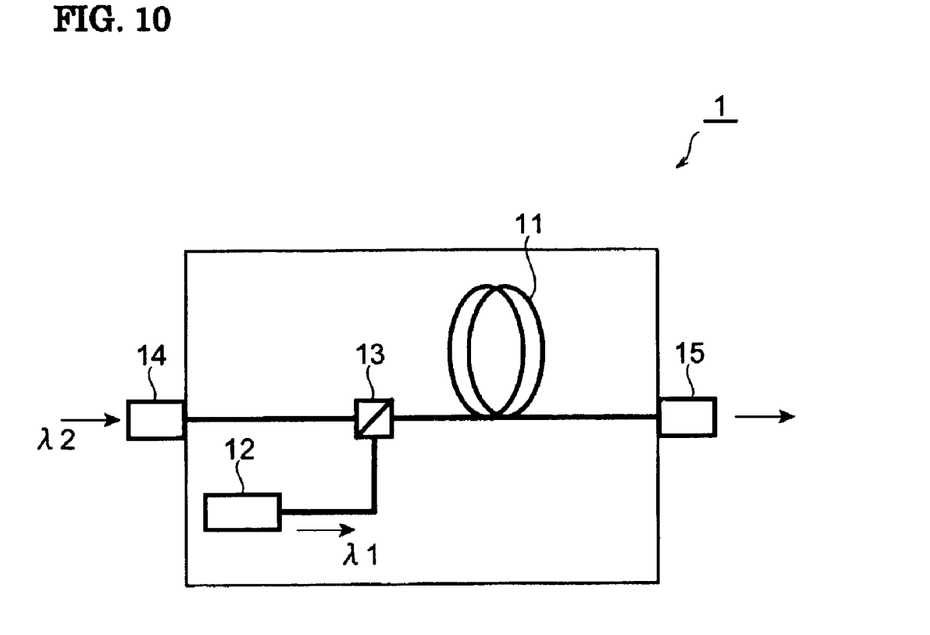
FIG. 10 is a conceptual view of an optical module according to an embodiment.

A description will now be given of an optical module including an optical fiber according to an embodiment of the invention. FIG. 10 is a conceptual view of an optical module 1 according to an embodiment. As shown in FIG. 10, the optical module 1 includes an optical fiber 11 according to the present invention, a light source 12, and a multiplexer 13.

The optical fiber 11 is an embodiment of the present invention and has a length of 10 to 1000 m, and has a zero dispersion wavelength $\lambda_0$. In particular, it is preferable that the optical fiber 11 have a refractive index distribution shown in FIG. 1, because this allows the zero-dispersion wavelength $\lambda_0$ to be 1550 nm, and the following function can be obtained in a communication waveband. The multiplexer 13 receives first light having a wavelength $\lambda_1$ output from the light source 12, and also receives second light having a wavelength $\lambda_2$, which is close to $\lambda_0$, input to an input port 14. The multiplexer 13 combines the first light and the second light, and launches the combined light into the optical fiber 11.

When the light source 12 outputs the first light having a wavelength $\lambda_1$ that is substantially equal to the wavelength $\lambda_0$, energy transfers from the first light to the second light in the optical fiber 11 because of an optical parametric effect, and the second light is thereby amplified. The second light amplified in the optical fiber 11 is output outside from an output port 15. By controlling on/off of the output of the light source 12, the intensity of the second light output from the output port 15 can be controlled. In addition, it is possible to produce another light having a wavelength $\lambda_3$ that satisfies the following condition:

$$\frac{1}{\lambda_3} = \frac{2}{\lambda_0} - \frac{1}{\lambda_2}$$

When the frequency difference $$\frac{1}{\lambda_1} - \frac{1}{\lambda_2}$$

is set to be equal to the peak frequency of a Raman gain of the optical fiber 11 (approximately 13 THz in silica glass), instead of setting the wavelength $\lambda_1$ to be equal to the zero dispersion wavelength $\lambda_0$, energy transfers from the first light to the second light because of stimulated Raman scattering, and the second light is thereby amplified. By controlling on/off of the output from the light source 12, the intensity of the second light output from the output port 15 can be controlled.

In the above-described optical module 1, it is preferable that the optical fiber 11 have an acoustic refractive index profile in which $\Delta_A/\Delta_O$ is 25 or more (the acoustic refractive index profile shown in FIG. 4, for example). This achieves a high SBS threshold value, and increases the upper limits of the power of the first light and the second light that can be launched to the optical fiber 11. Consequently, the light intensity can be controlled with a higher amplification gain and in a wider range. It is preferable that chromatic dispersion of the optical fiber be substantially zero at the wavelength $\lambda_1$, or that the Raman gain of the optical fiber substantially has a peak at the difference frequency between the wavelength $\lambda_1$ and the wavelength $\lambda_2$.

Since SBS is suppressed in the optical fiber 11 of the optical module 1, high-power laser light and a long interaction length can be used. For this reason, when the second light is amplified and controlled by the first light by using a nonlinear optical effect, a greater nonlinear optical effect can be achieved, and control can be exerted with a higher amplification gain and a higher function.

The present invention contains subject matter related to Japanese patent application Ser. No. 2005-310052 filed in the Japanese Patent Office on Oct. 25, 2005, the entire contents of which are incorporated herein by reference.

What is claimed is:

1. An optical fiber comprising:
    a core region including a center axis; and
    a cladding region surrounding the core region and having a refractive index lower than a refractive index of the core region and an acoustic velocity higher than an acoustic velocity of the core region,
    wherein an effective area is $5\lambda^2$ or less at at least one wavelength $\lambda$, and
    wherein the ratio of an acoustic relative refractive index difference to an optical relative refractive index difference of the optical fiber is 25 or more.

2. The optical fiber according to claim 1, wherein the core region contains fluorine and at least one of germanium and phosphorus.

3. An optical module comprising:
    the optical fiber according to claim 1;
    a light source that outputs first light having a wavelength $\lambda_1$; and
    a multiplexer that receives the first light and second light having a wavelength $\lambda_2$ and that multiplexes and couples the first light and the second light to the optical fiber.

4. The optical module according to claim 3, wherein chromatic dispersion of the optical fiber is substantially zero at the wavelength $\lambda_1$.

5. The optical module according to claim 3, wherein a Raman gain of the optical fiber substantially has a peak at a difference frequency between a frequency of the first light and a frequency of the second light.

6. An optical fiber comprising:
    a core region including a center axis; and
    a cladding region surrounding the core region and having a refractive index lower than a refractive index of the core region and an acoustic velocity higher than an acoustic velocity of the core region,
    wherein an effective area is $5\lambda^2$ or less at at least one wavelength $\lambda$,
    wherein a cable cutoff wavelength is shorter than the wavelength $\lambda$, and
    wherein the number of guided acoustic modes phase-matched with a fundamental optical mode at the wavelength $\lambda$ is 10 or more.

7. The optical fiber according to claim 6, wherein the core region contains fluorine and at least one of germanium and phosphorus.

8. An optical module comprising:
    the optical fiber according to claim 6;
    a light source that outputs first light having a wavelength $\lambda_1$; and
    a multiplexer that receives the first light and second light having a wavelength $\lambda_2$ and that multiplexes and couples the first light and the second light to the optical fiber.

9. The optical module according to claim 8, wherein chromatic dispersion of the optical fiber is substantially zero at the wavelength $\lambda_1$.

10. The optical module according to claim 8, wherein a Raman gain of the optical fiber substantially has a peak at a difference frequency between a frequency of the first light and a frequency of the second light.

* * * * *